United States Patent
Fox et al.

(10) Patent No.: US 9,083,456 B2
(45) Date of Patent: Jul. 14, 2015

(54) METHOD AND APPARATUS FOR DETECTING UNCHARACTERISTIC POWER LEVEL CHANGES OF AN OPTICAL SIGNAL

(71) Applicant: ADVA Optical Networking SE, Meiningen OT Dreissigacker (DE)

(72) Inventors: David Fox, Allen, TX (US); Lawrence T. Dillard, III, McKinney, TX (US); Neil Grayson, North Yorkshire (GB)

(73) Assignee: ADVA OPTICAL NETWORKING SE, Meiningen (DE)

( * ) Notice: Subject to any disclaimer, the term of this patent is extended or adjusted under 35 U.S.C. 154(b) by 267 days.

(21) Appl. No.: 13/693,594

(22) Filed: Dec. 4, 2012

(65) Prior Publication Data

US 2014/0153921 A1 Jun. 5, 2014

(51) Int. Cl.
*H04B 10/08* (2006.01)
*H04B 17/00* (2006.01)
*H04B 10/07* (2013.01)
*H04B 10/075* (2013.01)

(52) U.S. Cl.
CPC .............. *H04B 10/07* (2013.01); *H04B 10/075* (2013.01); *H04B 10/0705* (2013.01)

(58) Field of Classification Search
CPC ... H04B 10/07; H04B 10/0705; H04B 10/075
USPC .......................................................... 398/38
See application file for complete search history.

(56) References Cited

U.S. PATENT DOCUMENTS

| | | | |
|---|---|---|---|
| 5,640,512 A * | 6/1997 | Czerwiec ..................... 714/47.2 |
| 6,528,777 B2 * | 3/2003 | Ames et al. ................ 250/214 R |
| 6,599,039 B1 * | 7/2003 | Nakazato ........................ 398/25 |
| 6,627,867 B2 * | 9/2003 | Ames et al. ................ 250/214 R |
| 7,072,582 B2 * | 7/2006 | Stevens ............................ 398/38 |
| 7,092,586 B2 * | 8/2006 | Vokey et al. .................... 385/12 |
| 7,120,324 B2 * | 10/2006 | Murphy et al. ................. 385/12 |
| 7,394,981 B2 * | 7/2008 | Manifold ........................ 398/17 |
| 7,809,264 B2 * | 10/2010 | Schemmann et al. .......... 398/38 |
| 8,170,417 B2 * | 5/2012 | Liu et al. ........................ 398/83 |

(Continued)

FOREIGN PATENT DOCUMENTS

WO    WO 2008/144844 A1    12/2008

OTHER PUBLICATIONS

Grimble M J: "Non-linear minimum variance state-space-based estimation for discrete-time multi-channel systems", IET Signal Processing, vol. 5, No. 4, Jul. 8, 2011, pp. 365-378.

(Continued)

*Primary Examiner* — Ken Vanderpuye
*Assistant Examiner* — Abbas H Alagheband
(74) *Attorney, Agent, or Firm* — Jenkins, Wilson, Taylor & Hunt, P.A.

(57) ABSTRACT

A monitoring apparatus for detecting uncharacteristic short-term power level changes of an optical signal transmitted through an optical fiber, said monitoring apparatus comprising a power level variance calculation unit adapted to calculate a power level variance on the basis of a long-term power level and a current power level of said optical signal and a short-term variance filter adapted to filter transient changes indicated by the calculated power level variance and to generate a trouble occurrence indication indicating an uncharacteristic short-term power level change, if the filtered power level variance exceeds a predetermined power level variance.

19 Claims, 3 Drawing Sheets

(56) References Cited

U.S. PATENT DOCUMENTS

| | | | |
|---|---|---|---|
| 2003/0098407 A1* | 5/2003 | Ames et al. | 250/214.1 |
| 2004/0202476 A1* | 10/2004 | Woolf et al. | 398/135 |
| 2006/0002649 A1* | 1/2006 | Murphy et al. | 385/12 |
| 2006/0002650 A1* | 1/2006 | Vokey et al. | 385/12 |
| 2006/0127086 A1* | 6/2006 | Frankel | 398/19 |
| 2006/0139742 A1* | 6/2006 | Frankel et al. | 359/341.4 |
| 2007/0147844 A1* | 6/2007 | Harres | 398/135 |
| 2007/0248360 A1* | 10/2007 | Woolf et al. | 398/135 |
| 2008/0267623 A1* | 10/2008 | Manifold | 398/33 |
| 2010/0329669 A1* | 12/2010 | Cunningham et al. | 398/41 |
| 2012/0224846 A1 | 9/2012 | Swanson et al. | |
| 2012/0263460 A1* | 10/2012 | Movassaghi et al. | 398/38 |

OTHER PUBLICATIONS

Zubair MD Fadlullah et al: "An early warning system against malicious activities for smart grid communications", IEEE Network, IEEE Service Center, New York, NY, US, vol. 25, No. 5, Sep. 1, 2011, pp. 50-55.

European Search Report for Application No. 13168366.6 dated Mar. 27, 2014.

\* cited by examiner

METHOD AND APPARATUS FOR DETECTING UNCHARACTERISTIC POWER LEVEL CHANGES OF AN OPTICAL SIGNAL

FIELD OF THE INVENTION

The invention relates to an apparatus and a method for detecting uncharacteristic short-term and/or long-term power level changes of an optical signal transmitted through an optical fiber of an optical communication network.

BACKGROUND

Most optical transmission systems are capable of monitoring a received power of an optical signal over long periods of time such as days, hours or minutes. These conventional optical transmission systems use dedicated components to perform the monitoring of the power of a received optical signal transmitted through an optical fiber of said optical network. However, these conventional optical transmission systems have no technical means to detect short-term unusual or uncharacteristic changes in the received optical power levels. By tapping an optical signal transported through an optical fiber a third party might intentionally bend the optical fiber to extract the optical signal. This manipulation or intrusion causes uncharacteristic short-term power level changes of the optical signal transmitted through the optical fiber.

To increase security of the optical transmission system there is a need to provide a cost-effective way to monitor and to detect unusual or uncharacteristic short-term and/or long-term power level changes in the power level of the received optical signal which may indicate fiber plant trouble or intrusions without requiring additional optical signals, specialized receivers, equipment or specialized components dedicated to the measurement of short-term power level changes.

SUMMARY

The invention provides a monitoring apparatus for detecting uncharacteristic power level changes of an optical signal transmitted to an optical fiber, said apparatus comprising a power level variance calculation unit adapted to calculate a power level variance on the basis of a long-term power level and a current power level of said optical signal and a short-term variance filter adapted to filter transient changes indicated by the calculated power level variance and to generate a trouble occurrence indication indicating an uncharacteristic short-term power level change, if the filtered power level variance exceeds a predetermined power level variance.

In a possible embodiment of the monitoring apparatus according to the present invention the apparatus comprises a long-term differential signal filter adapted to filter measured power levels of said optical signal to provide the long-term power level applied to said power level variance calculation unit.

In a possible embodiment of the monitoring apparatus according to the present invention the power levels of said optical signal are measured by a fiber optic data receiver adapted to receive data signals via the optical fiber.

In a further possible embodiment of the monitoring apparatus according to the present invention the measured power levels comprise power levels measured by a near-end fiber optic data receiver and/or power levels measured by a far-end fiber optic data receiver transported via the optical fiber.

In a still further possible embodiment of the monitoring apparatus according to the present invention the power levels measured by the far-end fiber optic data receiver are encoded by a remote data signal processing unit and transported via the optical fiber to the near-end fiber optic data receiver being connected to a decoding unit adapted to decode the received encoded power levels.

In a still further possible embodiment of the monitoring apparatus according to the present invention the apparatus comprises an oversampling filter adapted to receive the power levels measured by the near-end fiber optic data receiver and/or the decoded power levels supplied by said decoding unit and to perform an oversampling of the received power levels with a predetermined oversampling ratio to reduce aliasing and signal noise and/or to increase the resolution of an analog to digital converter provided in said near-end fiber optic data receiver and/or in said far-end fiber optic data receiver.

In a possible embodiment of the monitoring apparatus according to the present invention the apparatus further comprises a power level sampling unit which is adapted to receive periodically the oversampled power levels from said oversampling filter and to supply a current power level to said power level variance calculation unit and a set of power levels to said long-term differential signal filter.

In a still further possible embodiment of the monitoring apparatus according to the present invention the long-term differential signal filter is adapted to perform a modified exponential moving average (MEMA) calculation on the basis of the power levels provided by said power level sampling unit.

In a still further possible embodiment the monitoring apparatus further comprises a database which is adapted to store historical data.

In a possible embodiment the database is adapted to store the power levels provided by the power level sampling unit.

In a still further possible embodiment the database is adapted also to store the long-term power levels calculated by the long-term differential signal filter.

In a still further possible embodiment the database stores the power level variance calculated by said power level variance calculation unit.

In a still further possible embodiment the database stores the trouble occurrence indications generated by the short-term variance filter.

In a still further possible embodiment of the monitoring apparatus according to the present invention the trouble occurrence indication generated by said short-term variance filter is output to a terminal of a remote network operator and/or to a terminal of a local system operator.

In a still further possible embodiment of the monitoring apparatus according to the present invention the short-term variance filter is adapted to generate a trouble occurrence clear indication if the filtered power level variance is less than the predetermined power level variance.

In a possible implementation of the monitoring apparatus according to the present invention the oversampling ratio of the oversampling filter is set to four.

In a possible embodiment of the monitoring apparatus according to the present invention the trouble occurrence indication is generated by said short-term variance filter, if the filtered power level variance exceeds ±1 dB within a predetermined time period.

In a further possible embodiment of the monitoring apparatus according to the present invention the fiber optic data receiver is integrated in a pluggable SFP transceiver.

The invention further provides an optical network access apparatus comprising at least one pluggable transceiver having a fiber optic data receiver adapted to measure power levels of a received optical signal and comprising a monitoring apparatus adapted to detect uncharacteristic power level changes of an optical signal transmitted through an optical fiber, said monitoring apparatus comprising a power level variance calculation unit adapted to calculate a power level variance on the basis of a long-term power level and a current power level of said optical signal and a short-term variance filter adapted to filter transient changes indicated by the calculated power level variance and to generate a trouble occurrence indication indicating an uncharacteristic short-term power level change, if the filtered power level variance exceeds a predetermined power level variance.

According to a further aspect of the present invention an optical transmission system is provided comprising optical network access apparatuses connected to each other via at least one optical fiber, wherein each network apparatus comprises at least one pluggable transceiver having a fiber optic data receiver adapted to measure a power level of a received optical signal and a monitoring apparatus adapted to detect uncharacteristic power level changes in said optical signal, wherein said monitoring apparatus comprises a power level variance calculation unit adapted to calculate a power level variance on the basis of a long-term power level and a current power level of said optical signal and a short-term variance filter adapted to filter transient changes indicated by the calculated power level variance and to generate a trouble occurrence indication indicating an uncharacteristic short-term power level change, if the filtered power level variance exceeds a predetermined power level variance.

According to a further aspect of the present invention a method for detecting uncharacteristic short-term power level changes of an optical signal transmitted through an optical fiber is provided.

The method for detecting uncharacteristic short-term power level changes of an optical signal transmitted through an optical fiber comprises the following steps:

calculating a power level variance on the basis of a long-term power level and a current power level of said optical signal and filtering transient changes indicated by the calculated power level variance and generating a trouble occurrence indication indicating an uncharacteristic short-term power level change if the filtered power level variance exceeds a predetermined power level variance.

The invention further provides an optical network access apparatus comprising a monitoring apparatus adapted to perform a method for detecting uncharacteristic short-term power level changes of an optical signal transmitted to an optical fiber wherein said method comprises the steps of:

calculating a power level variance on the basis of a long-term power level and a current power level of said optical signal and filtering transient changes indicated by the calculated power level variance and generating a trouble occurrence indication indicating an uncharacteristic short-term power level change if the filtered power level variance exceeds a predetermined power level variance.

The invention further comprises a method for detecting uncharacteristic short-term and/or long-term power level changes or fluctuations of an optical signal transmitted through an optical fiber to a transceiver wherein a first trouble occurrence indication indicating an uncharacteristic short-term power level change is generated if a filtered power level variance exceeds a predetermined power level variance;

a second trouble occurrence indication indicating a long-term power level change is generated if a current power level is outside an operating power range of the transceiver.

BRIEF DESCRIPTION OF THE DRAWINGS

In the following possible embodiments of the apparatus and method for detecting uncharacteristic short-term power changes of an optical signal transmitted through an optical fiber are described with reference to the enclosed figures in more detail.

DETAILED DESCRIPTION

Figure 1:
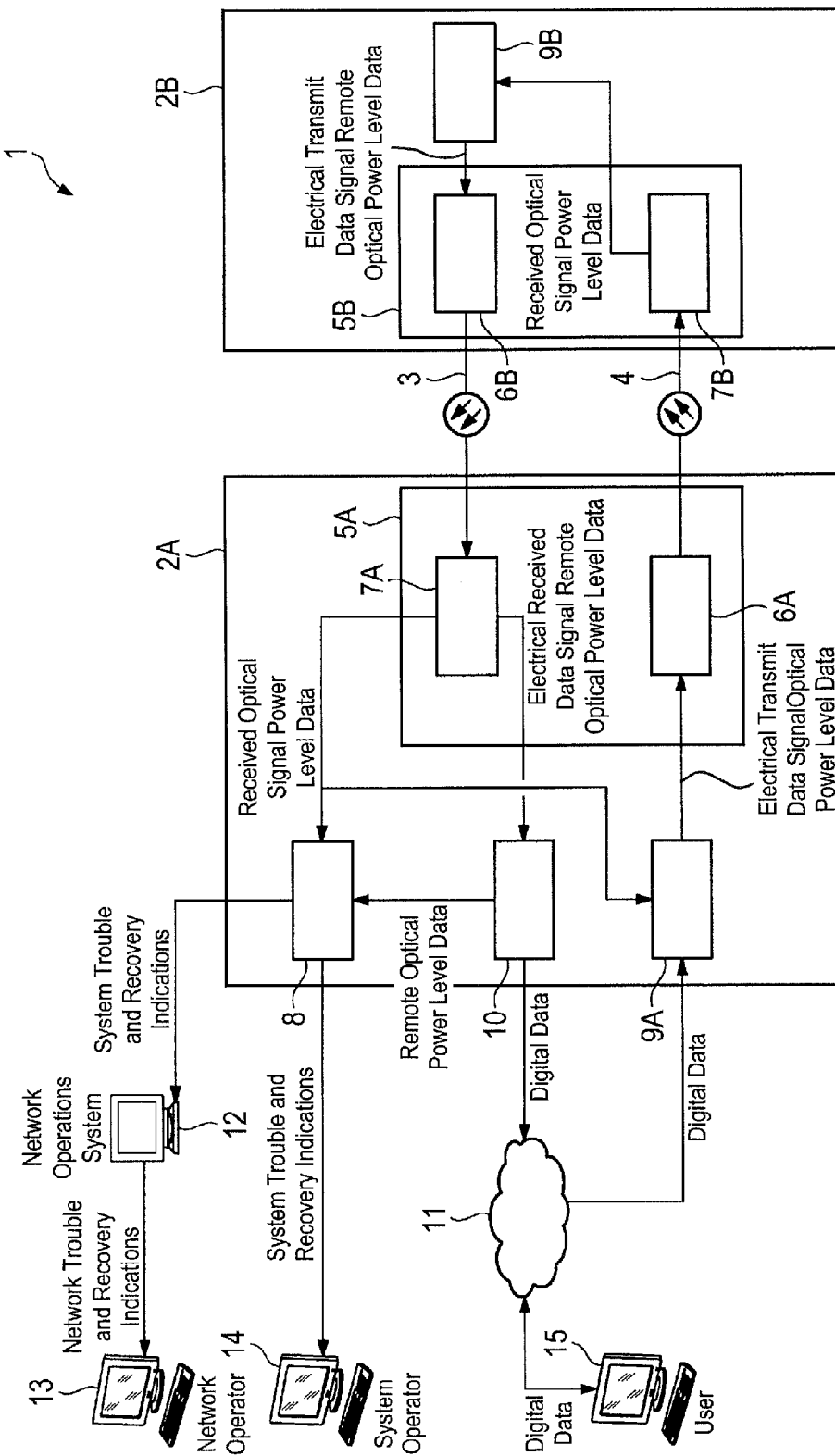
FIG. 1 shows a block diagram of an exemplary optical transmission system comprising optical network access apparatuses which comprise a monitoring apparatus according to the present invention.

FIG. 1 shows a block diagram of an exemplary optical transmission system 1 comprising a first near-end optical network access apparatus 2A and a remote optical network access apparatus 2B connected to each other via an optical transmission medium. In the exemplary embodiment shown in FIG. 1 the near-end optical network access apparatus 2A is connected to the remote optical network access apparatus 2B via a first and second optical fiber 3, 4 carrying optical signals between the optical network access apparatuses 2A, 2B. The number of optical fibers connecting apparatuses 2A, 2B can vary. It is also possible that the optical network apparatuses 2A, 2B are connected to each other via a single fiber when optical signals are transported in both directions, for instance on different wavelengths. In the example shown in FIG. 1 a first optical fiber 3 is provided to carry optical signals from the remote optical access apparatus 2B to the near-end optical network apparatus 2A, whereas the second optical fiber 4 is provided for transporting optical signals from the first optical network access apparatus 2A to the remote optical network access apparatus 2B. Both optical network apparatuses 2A, 2B comprise an optical transceiver 5A, 5B as shown in FIG. 1. In a possible embodiment the optical transceiver can be a pluggable transceivers which is plugged into a host device. In a specific implementation the pluggable optical transceiver can be formed by an SFP pluggable transceiver. The pluggable transceiver 5A, 5B comprise each a fiber optic transmitter 6A, 6B and a fiber optic receiver 7A, 7B as shown in FIG. 1. The fiber optic receiver 7A, 7B is adapted to receive and detect optical data signals transported through the optical fibers 3, 4. The fiber optic receivers 7A, 7B do also measure power levels of the received optical signals. As can be seen in FIG. 1 the measured power level measured by the near-end fiber optic receiver 7A is applied directly to a monitoring apparatus 8 within the near-end optical network access apparatus 2A. The measured power levels generated by the far-end optic receiver 7B are provided to a data signal processing unit 9B which is provided to encode digital signals. The data signal processing unit 9B encodes the received power level measurements measured by the far-end fiber optic transceiver 7B which are then transmitted by the fiber optic transmitter 6B through the fiber 3 to the near-end fiber optic receiver 7A. The near-end fiber optic receiver 7A supplies an electrical received data signal along with remote optical power level data originating from the far-end fiber optic receiver 7B to a data signal processing unit 10 which is adapted to decode digital data and to provide the monitoring apparatus 8 with remote optical power level data originally measured by the far-end fiber optic receiver 7B. Accordingly, the measured power levels received by the monitoring apparatus 8 comprise power levels measured by the near-end fiber optic data receiver 7A and/or power levels measured by the far-end fiber optic data receiver 7B and transported via the optical fiber 3. As can be seen the optical network access apparatus 2A can also comprise a data signal processing unit 9A for encoding digital data received from a data network 11. The received digital data decoded by the data signal processing unit 10 is output by the network access system apparatus 2A to the data network 11 as shown in FIG. 1.

The monitoring apparatus 8 of the optical network access apparatus 2A is adapted to detect uncharacteristic short-term power level changes of an optical signal transmitted through an optical fiber. The monitoring apparatus 8 comprises a power level variance calculation unit 8-5 adapted to calculate a power level variance on the basis of a long-term power level and a current power level of the optical signal. Further, the monitoring apparatus 8 comprises a short-term variance filter 8-6 adapted to filter transient changes indicated by the calculated power level variance and to generate a trouble occurrence indication indicating an uncharacteristic short-term power level change if the filtered power level variance exceeds a predetermined power level variance. This trouble occurrence indication can be supplied by the monitoring apparatus 8 to a network operation system 12 and from there to a terminal 13 of a remote network operator. Further, the trouble occurrence indication can be supplied to a terminal 14 of a local system operator. In a possible implementation the monitoring apparatus 8 does not only track and distinguish short-term fluctuations but also long-term fluctuations.

A terminal 15 of a user is connected to the data network 11 and exchanges digital data with the near-end optical network apparatus 2A comprising the encoding unit 9A and the decoding unit 10. The encoded digital data is transmitted by the fiber optic transmitter 6A and fiber 4 to the far-end optical network access apparatus 2B as shown in FIG. 1. The digital data encoded by the encoding unit 9B and transmitted by the fiber optic transmitter 6B is transported through the fiber 3 and received by the fiber optic data receiver 7A. The received optical data is converted into an electrical data signal and decoded by the decoding unit 10 to be supplied to the terminal 15 of the user via the data network 11. In the optical network access apparatus the same transceiver is used to both directly measure power levels of the received optical signals and to convey digital data to and from the data network 11. Both optical network access apparatuses 2A, 2B can engage in communication with a corresponding data network.

Figure 2:
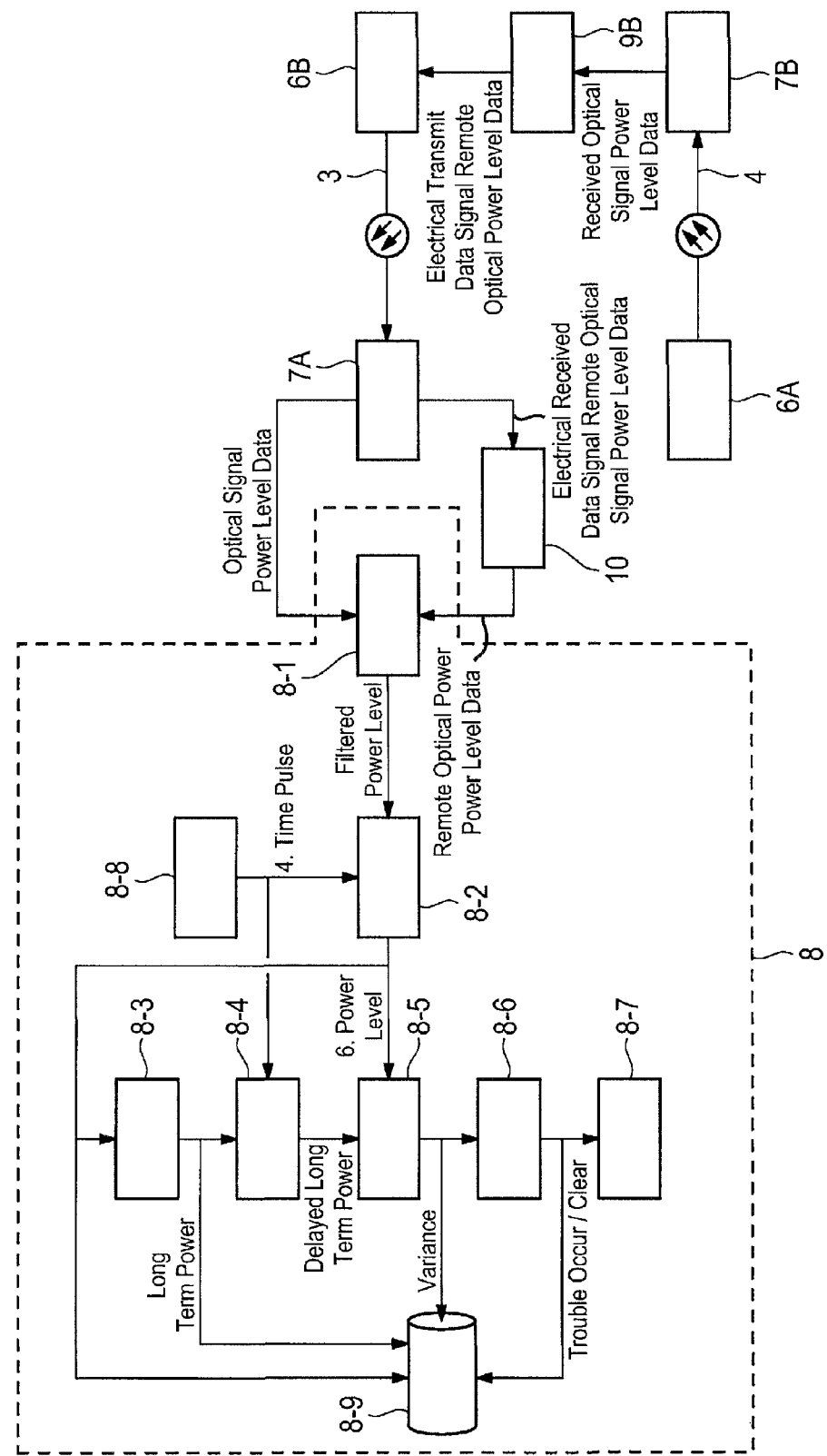
FIG. 2 shows a block diagram for illustrating a possible embodiment of a monitoring apparatus according to the present invention.

FIG. 2 shows a block diagram for illustrating a possible embodiment of the monitoring apparatus 8. In the shown embodiment of FIG. 2 the monitoring apparatus 8 comprises an oversampling optical power filter 8-1 adapted to receive the power levels measured by the near-end fiber optic data receiver 7A and/or the decoded power levels supplied by the decoding unit 10 of the optical network access apparatus 2A as shown in FIG. 2. The oversampling filter 8-1 performs an oversampling of the received power levels with a predetermined oversampling ratio. In a possible implementation the oversampling ratio can be set to four. The oversampling is performed to reduce aliasing and signal noise and/or to increase the resolution of an analog to digital converter provided within said near-end fiber optic data receiver 7A and/or in said far-end fiber optic data receiver 7B.

The monitoring apparatus 8 further comprises a power level sampling unit 8-2 which is adapted to receive periodically the oversampled power levels from the oversampling filter 8-1. The power level sampling unit 8-2 supplies a set of power levels or power level samples to a long-term differential signal filter 8-3. In a possible embodiment the long-term differential signal filter 8-3 is adapted to perform a modified exponential moving average MEMA calculation on the basis of the power levels received from the power level sampling unit 8-2. The number of power level samples supplied by the power level sampling unit 8-2 to the long-term differential signal filter 8-3 can vary and is configurable in a possible implementation of the monitoring apparatus 8. The calculated modified exponential moving average value is used to represent the normal or characteristic operating power level and is calculated over a time period which is configurable by the operator. This allows the operator to fine-tune the sensitivity of the monitoring system to meet the needs of the respective optical network. The calculated long-term power level output by the long-term differential signal filter 8-3 is delayed by a delay unit 8-4 and the delayed long-term power is then supplied to a power level variance calculation unit 8-5 which is adapted to calculate a power level variance on the basis of the long-term power level and a current power level of said optical signal received directly from the power level sampling unit 8-2. The calculated power level variance is output by the power level variance calculation unit 8-5 to a short-term variance filter 8-6 as shown in FIG. 2. The short-term variance filter 8-2 is adapted to filter transient changes indicated by the calculated power level variance and to generate a trouble occurrence indication indicating an uncharacteristic short-term power level change if the filtered power level variance exceeds a predetermined power level variance. The generated trouble occurrence indication can be supplied to an operator alert notifier 8-7 as shown in FIG. 2. As shown in FIG. 2 the delay circuit 8-4 and the power level sampling unit 8-2 receive time pulses, i.e. a clock signal, from a timebase unit 8-8 as shown in FIG. 2.

In a possible embodiment the monitoring apparatus 8 further comprises a database 8-9 which can record historical data to assist in analyzing the underlying cause of the uncharacteristic short-term power level changes detected by the monitoring unit 8. In a possible implementation the database 8-9 stores the power levels provided by the power level sampling unit 8-2. In a possible embodiment the database can also store the long-term power levels calculated by the long-term differential signal filter 8-3. In a further possible embodiment the database 8-9 further stores the power level variances calculated by the power level variance calculation unit 8-5. In a still further possible implementation the database 8-9 can also store the trouble occurrence indications generated by the short-term variance filter 8-6. In a possible embodiment the recorded data stored in the historical database 8-9 can be read out from the monitoring unit 8 via an interface.

The monitoring apparatus 8 can be used to alert an operator of an unexpected change of the optical power level and provides a continuous monitoring of the condition of the optical transmission system. It can assist the operator's determination of the cause of the change over a period of time. The monitoring apparatus 8 is adapted to detect unexpected changes in the power levels over a period of time and to alert an operator about a problem at the optical receiver. The monitoring apparatus 8 can further provide an analysis of the unexpected power level change and in a possible embodiment the monitoring apparatus can further indicate that the power level has returned to the normal characteristic level and generate a corresponding trouble clear indication. The short-term variance filter 8-6 is adapted to generate a trouble occurrence clear indication if the filtered power level variance is less than the predetermined power level variance which can be configured by the network operator. Accordingly, the monitoring apparatus 8 in a possible embodiment can generate trouble occurrence indications as well as trouble occurrence clear indications provided to an operator. In a specific embodiment the trouble occurrence indication is generated by the short-term variance filter 8-6 of the monitoring unit 8 if the filtered power level variance exceeds ±1 dB within a predetermined period of e.g. five seconds. In a possible embodiment the operator may configure both the unacceptable magnitude or threshold as well as the duration of the time period to further fine-tune the monitoring system for the particular optical network. Once an uncharacteristic short-term power level change has been detected or determined the monitoring apparatus 8 alerts the operator of the detected condition. The monitoring apparatus 8 then continues to monitor the signal determining whether the condition still exists or to find that the abnormal condition no longer exists. It will then alert the operator by outputting a trouble occurrence clear notification. The time-analyzed characteristic power level is compared to a set of conditioned present power level measurements by the monitoring unit 8 to calculate both magnitude and duration of power level changes. Different methods can be used to determine the characteristic power and condition present measurements. Deviations exceeding a predetermined magnitude and duration do trigger an alert sent to the operator of the network. The signal is then monitored by the monitoring apparatus 8 which provides an indication when the abnormal condition no longer exists.

Figure 3:
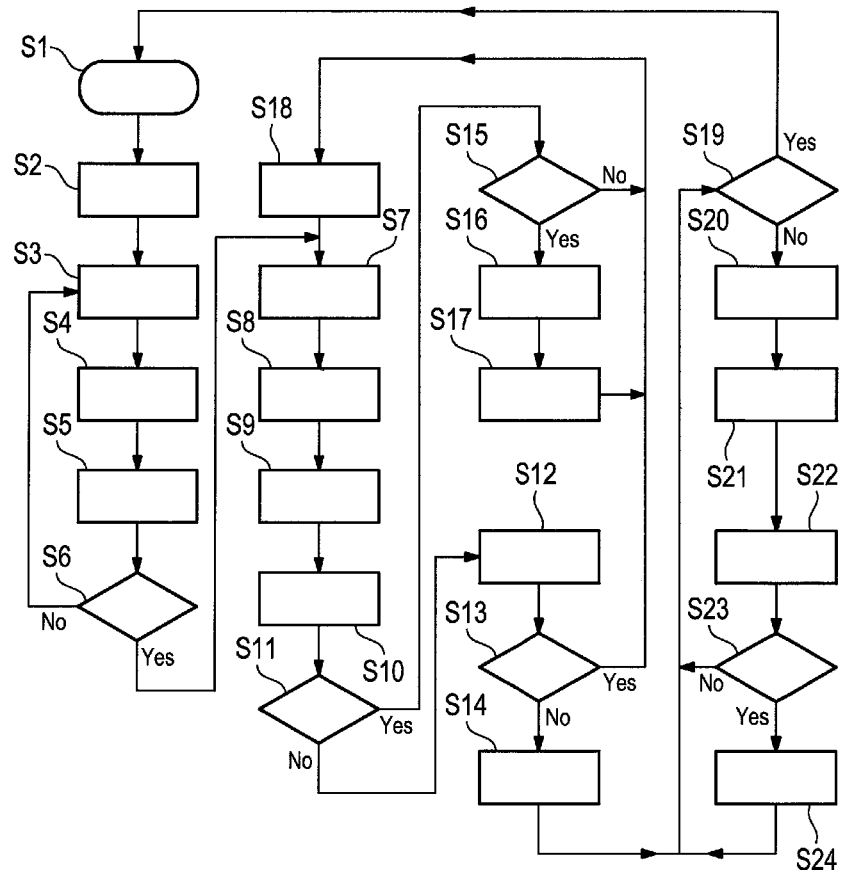
FIG. 3 shows a flowchart for illustrating the operation of an exemplary embodiment of a monitoring apparatus according to the present invention.

FIG. 3 shows a flowchart of a specific implementation of a method for detecting uncharacteristic short-term power level changes of an optical signal transmitted through an optical fiber. FIG. 3 shows a differential optical power analysis flowchart. The processing is applied to each set of measurements taken by the same optical receiver separately for every receiver being analyzed, both local and remote.

Before monitoring the power level changes starts the long-term power value is calibrated in steps S1 to S6. In the first step S1 the long-term power is initialized and a glitch is set to 0 for calibration purposes. A glitch is a state information which is used by the power level variance calculation unit 8-6. After having initialized the long-term power and the glitch value the long-term power is computed in step S2 from current raw oversampled power level data.

In a further step S3 it is waited for a time pulse received from the timebase unit 8-8 of the monitoring unit 8.

In a further step S4 the power level is computed from current raw oversampled power level data.

In a step S5 the long-term power is recomputed to include power level using exponential moving average with a window size specified by the operator.

In a step S6 it is decided whether the long-term power is properly calibrated or not. If not, the flow returns to step S3 as shown in FIG. 3.

After having successfully calibrated the long-term power the monitoring of the power level changes starts. The monitoring process is triggered whenever a time pulse is received. In step S7 it is waited for the next time pulse received from the timebase 8-8. In a step S8 the power level is computed from the current raw oversampled power level data. In a further step S9 the power level variance is calculated on the basis of the long-term power level and the current power level of the optical signal. The computation in step S9 is performed by the power level variance calculation unit 8-5 of the monitoring unit 8. In a further step S10 the power level, calculated long-term power and calculated power level variance is recorded for later retrieval by the operator in the historical database 8-9 of the monitoring unit 8.

In a further step S11 it is checked whether the absolute value of the calculated power level variance is less than a variance specified by the operator. If this is not the case, i.e. when the calculated variance exceeds the predetermined power level variance specified by the operator, a glitch, i.e. state information, is incremented by 1 in step S12. In a further step S13 it is decided whether the glitch is less than a threshold value specified by the operator. If this is not the case, i.e. when the glitch value exceeds the threshold value specified by the operator, a trouble occurrence indication is generated and the operator is notified in step S14 that the power level variance is greater than the variance specified by the operator.

Contrary, when in step S11 it is decided that the absolute value of the calculated power level variance is less than the variance specified by the operator the flow proceeds to step S15. In step S15 it is decided whether the glitch value is greater than 0 or not. If the glitch or glitch counter is greater than 0 the recorded glitch count is incremented in step S16 by 1. It is then recorded for later retrieval by the operator in step S16, for instance in the historical database 8-9.

The glitch counter is reset, i.e. set to 0, in step S17. If it has been decided in step S13 that the glitch is less than the value specified by the operator and after reset of the glitch in step S17, the flow proceeds further with step S18 where the long-term power is recomputed to include power level using for instance exponential moving average with a window size specified by the operator. From there the loop continues with step S7 as shown in FIG. 3.

After having output the trouble occurrence indication in step S16 the flow proceeds further with step S19 as shown in FIG. 3. In step S19 it is decided whether the operator has requested to re-initialize the system. If this is the case the flow returns to the calibration process and starts to initialize the long-term power and glitch value or glitch counter to 0 in step S1. If there is no operator request for re-initialization the process waits for the next time pulse generated by the timebase 8-8 in step S20.

In step S21 the power level is computed from current raw oversampled power level data similar to step S8. In a further step S22 the power level variance is calculated between the long-term power and the current power level similar to step S9. After that, in step S23 it is checked whether the absolute value of the calculated power level variance is less than the variance specified by the operator. If this is not the case the process loops back to step S19 as shown in FIG. 3. However, if the absolute value of a calculated power level variance does no longer exceed the variance specified by the operator the operator is notified in step S24 that the power level variance is less than the variance specified by the operator and a trouble occurrence clear indication signal is supplied to the operator.

In the embodiment shown in FIG. 3 a trouble is indicated when the calculated power level variance is greater than allowed by the operator for a certain number of time periods which can be configured by the operator. The current number of consecutive time periods where the calculated power level variance has been greater than allowed, is counted by the glitch counter. If the glitch counter exceeds the operator configured limit or threshold, the monitoring apparatus 8 notifies the operator and begins to monitor for the power level variance to become less than the allowed value. The operator is notified in step S24 after the power level variance has returned to the normal range. The monitoring apparatus 8 does continue to perform the monitoring until the operator initializes the system.

The monitoring process shown in FIG. 3 can be implemented by instructions of a computer program which can be executed by a processor of the monitoring apparatus 8 shown in FIG. 1.

FIG. 3 shows an embodiment of a method for detecting uncharacteristic short-term power level changes of an optical signal if a filtered power level variance exceeds a predetermined power level variance. In a possible further embodiment the method according to the present invention tracks and distinguishes short-term and long-term fluctuations. To track also the long-term fluctuations the current power level of the optical signal is compared to an absolute power range. This absolute power range is specific to the pluggable transceiver, i.e. SFP, in use. If it is determined that the current power level is outside the operating power range of the transceiver a corresponding trouble occurrence indication is generated to alert an operator.

Figure 4:
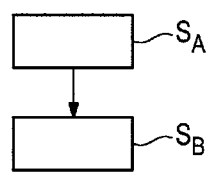
FIG. 4 shows a flowchart for illustrating a possible embodiment of a method for detecting uncharacteristic short-term power level changes according to the present invention.

FIG. 4 shows a flowchart of a possible embodiment of the method for detecting uncharacteristic short-term power level changes of an optical signal transmitted through an optical fiber.

The flowchart of FIG. 4 shows the mainsteps of the method.

In a first step SA the power level variance is calculated on the basis of a long-term power level and a current power level of the optical signal. This power level variance calculation can be performed by the power level variance calculation unit 8-5 in the monitoring apparatus 8 as shown in FIG. 2.

In a further step SB transient changes indicated by the calculated power level variance are filtered and a trouble occurrence indication indicating an uncharacteristic short-term power level change is generated if the filtered power level variance exceeds a predetermined power level variance. The filtering in step SB can be performed in a possible implementation by the short-term variance filter 8-6 within the monitoring apparatus 8 as shown in FIG. 2.

In a possible embodiment the power samples are four times oversampled and averaged to reduce measurement noise and to increase a ND-resolution by 1 bit.

That is at the time of a power sample the power level is read four sequential times and averaged.

The power samples variance is the difference between the power sample value and the average power value. The variance is crossed when its absolute value is greater than a maximum variance configured by the operator.

An appearance of one or more sequential out of variance power samples are considered as glitches and can be filtered according to the configuration. Signal out of range and LOS events are considered as glitches and are always alarmed. In a possible implementation the power average function provided by the long-term differential signal filter 8-3 can be a modified exponential moving average, EMA, which is an approximation of the sliding window average. The value of the power average function E is computed in a possible implementation as follows:

$$E(1)=P(1)$$

$$E(n)=E(n-1)+(A+B(n))\times(P(n)-E(n-1))$$

$$B(n)=n^{-1.02}; n<10000$$

$$B(n)=0; n\geq 10000$$

wherein $A=2.4278\times(W^{-1.02})$
W is the size of the averaging window n is the sample number since last clearance
P(k) is the k-th power sample and
E(k) is the value of the averaging function for the k-th power sample.

The addition of B(n) to the coefficient improves the convergence time of the average to actual during initial calibration and accumulation of history as compared to standard EMA. This is achieved by more heavily weighing the contribution of the current sample to the average. Unlike a standard EMA where the contribution of the current sample is constant based on the window size, the modified EMA decreases this contribution as more samples are accumulated which produces the described effect. It is eventually set to 0 due to limitations of numerical methods.

In a possible embodiment the monitoring apparatus 8 can be connected to a pluggable transceiver, in particular to a pluggable SFP transceiver.

In a possible implementation the monitoring apparatus 8 can even be integrated in the SFP pluggable transceiver.

The monitoring apparatus 8 according to the present invention can be implemented in the optical network access apparatus 2 as shown in FIG. 1. The optical network access apparatus 2 can form part of an optical transmission system. In a possible application the optical network access apparatus can form part of a WDM system, in particular a dense WDM system. The monitoring apparatus 8 according to the present invention can use SFP MSA digital diagnostics to detect ±1.0 dB or greater changes in the received optical power levels on optical ports. In a possible embodiment the intrusion detection mechanism according to the present invention provides a 100% detection rate with no false positives. The method and apparatus according to the present invention provides tolerance to short-term variations and long-term degradation of the received signal level. The monitoring mechanism according to the present invention can make use of SFP MSA standard integrated digital diagnostic monitoring sensors. These low-cost sensors do not provide a high degree of absolute accuracy across their entire input power range but have a relatively low differential nonlinearity error DNL. DNL is the measure of how far off the difference of two device measurements are from the true difference between two different power level inputs. The differential nonlinearity DNL indicates the error between the measurements of two different input powers. If the pluggable transceiver shows good repeatability and its DNL is low the difference between the measurements is accurate and changes in the optical power level can be detected even if the absolute accuracy is poor. In a possible implementation the monitoring apparatus 8 is specified to detect a ±1.0 dB change in the received optical power level. Accordingly, a qualified pluggable transceiver does provide received optical measurements with a high repeatability and a low DNL. The pluggable transceiver does provide at least 0.1 dB repeatability. The DNL must be relatively small in the order of 0.2 dB/dB. The pluggable transceiver does in a possible implementation have a precision of 0.1 dB to support the repeatability and DNL measurement parameters.

The invention claimed is:

1. A monitoring apparatus for detecting uncharacteristic power level changes of an optical signal transmitted through an optical fiber, said monitoring apparatus comprising:
a power level variance calculation unit adapted to calculate a power level variance on the basis of a long-term power level and a current power level of said optical signal and
a short-term variance filter adapted to filter transient changes indicated by the calculated power level variance and to generate a trouble occurrence indication indicating an uncharacteristic short-term power level change, if the filtered power level variance exceeds a predetermined power level variance.

2. The monitoring apparatus according to claim 1, wherein said monitoring apparatus further comprises a long-term differential signal filter adapted to filter measured power levels of said optical signal to provide the long-term power level applied to said power level variance calculation unit.

3. The monitoring apparatus according to claim 1, wherein the power levels of said optical signal are measured by a fiber optic data receiver adapted to receive data signals via the optical fiber.

4. The monitoring apparatus according to claim 3, wherein the measured power levels comprise power levels measured by a near-end fiber optic data receiver and/or power levels measured by a far-end fiber optic data receiver and transported via the optical fiber.

5. The monitoring apparatus according to claim 4, wherein the power levels measured by the far-end fiber optic data receiver are encoded by a remote data signal processing unit and transported via the optical fiber to the near-end fiber optic data receiver being connected to a decoding unit adapted to decode the received encoded power levels.

6. The monitoring apparatus according to claim 5 comprising an oversampling filter adapted to receive the power levels measured by the near-end fiber optic data receiver and/or the decoded power levels supplied by said decoding unit and to perform an oversampling of the received power levels with a predetermined oversampling ratio to reduce aliasing and signal noise and/or to increase a resolution of an analog to digital converter provided in said near-end fiber optic data receiver and/or in said far-end fiber optic data receiver.

7. The monitoring apparatus according to claim 6, wherein a power level sampling unit is adapted to receive periodically the oversampled power levels from said oversampling filter and to supply a current power level to said power level variance calculation unit and a set of power levels to said long-term differential signal filter.

8. The monitoring apparatus according to claim 7, wherein said long-term differential signal filter is adapted to perform a modified exponential moving average (MEMA) calculation on the basis of the power levels provided by said power level sampling unit.

9. The monitoring apparatus according to claim 8, further comprising a database which is adapted to store the power levels provided by the power level sampling unit, and/or the long-term power levels calculated by the long-term differential signal filter and/or the power level variances calculated by said power level variance calculation unit and/or the trouble occurrence indications generated by said short-term variance filter.

10. The monitoring apparatus according to claim 1, wherein said trouble occurrence indication generated by said short-term variance filter is output to a terminal of a remote network operator and/or to a terminal of a local system operator.

11. The monitoring apparatus according to claim 1, wherein said short-term variance filter is adapted to generate a trouble occurrence clear indication if the filtered power level variance is less than the predetermined power level variance.

12. The monitoring apparatus according to claim 6, wherein the oversampling ratio of said oversampling filter is set to four.

13. The monitoring apparatus according to claim 1, wherein the trouble occurrence indication is generated by said short-term variance filter, if the filtered power level variance exceeds ±1 dB within a predetermined time period.

14. The monitoring apparatus according to claim 3, wherein said fiber optic data receiver is integrated in a pluggable SFP-transceiver.

15. An optical network access apparatus comprising at least one pluggable transceiver having a fiber optic data receiver adapted to measure power levels of a received optical signal and comprising a monitoring apparatus according to claim 1 adapted to detect uncharacteristic short-term power level changes in said optical signal.

16. An optical transmission system comprising optical network access apparatuses according to claim 15 connected to each other via at least one optical fiber.

17. A method for detecting uncharacteristic short-term power level changes of an optical signal transmitted through an optical fiber said method comprising the steps of:
  (a) calculating a power level variance via a calculation unit on the basis of a long-term power level and a current power level of said optical signal and
  (b) filtering transient changes indicated by the calculated power level variance via a filter and generating a trouble occurrence indication indicating an uncharacteristic short-term power level change if the filtered power level variance exceeds a predetermined power level variance.

18. A method for detecting uncharacteristic short-term and/or long-term power level changes or fluctuations of an optical signal transmitted through an optical fiber to a transceiver, comprising:
  generating a first trouble occurrence indication at a monitoring apparatus indicating an uncharacteristic short-term power level change if a filtered power level variance from a short-term variance filter exceeds a predetermined power level variance; and
  generating a second trouble occurrence indication at the monitoring apparatus indicating a long-term power level change is generated if a current power level is outside an operating power range of the transceiver.

19. The method of claim 17 or 18 wherein the method is performed in a monitoring apparatus of an optical network access apparatus.

* * * * *